United States Patent
Leiba

(10) Patent No.: US 9,641,260 B2
(45) Date of Patent: May 2, 2017

(54) SYSTEMS AND METHODS FOR IMPROVING THE QUALITY OF MILLIMETER-WAVE COMMUNICATION

(71) Applicant: Siklu Communication Ltd., Petach-Tikva (IL)

(72) Inventor: Yigal Leiba, Holon (IL)

(73) Assignee: Siklu Communication Ltd., Petach-Tikva (IL)

(*) Notice: Subject to any disclaimer, the term of this patent is extended or adjusted under 35 U.S.C. 154(b) by 93 days.

(21) Appl. No.: 13/918,976

(22) Filed: Jun. 16, 2013

(65) Prior Publication Data
US 2014/0370925 A1 Dec. 18, 2014

(51) Int. Cl.
*H04B 10/90* (2013.01)
(52) U.S. Cl.
CPC .................................. *H04B 10/90* (2013.01)
(58) Field of Classification Search
CPC combination set(s) only.
See application file for complete search history.

(56) References Cited

U.S. PATENT DOCUMENTS

| | | | |
|---|---|---|---|
| 8,315,326 B2 | 11/2012 | Agee et al. | |
| 8,315,327 B2 | 11/2012 | Agee et al. | |
| 8,363,744 B2 | 1/2013 | Agee et al. | |
| 2009/0239483 A1* | 9/2009 | Rofougaran | 455/90.2 |
| 2011/0182174 A1 | 7/2011 | Pi et al. | |
| 2013/0295852 A1* | 11/2013 | Kim et al. | 455/63.4 |
| 2015/0263429 A1* | 9/2015 | Vahidpour | H01Q 1/36 343/770 |

* cited by examiner

*Primary Examiner* — Junpeng Chen
(74) *Attorney, Agent, or Firm* — Active Knowledge Ltd.

(57) ABSTRACT

Various embodiments of a millimeter-wave wireless point-to-point or point-to-multipoint communication network in which the different atmospheric absorption rates of different millimeter-wave frequencies are utilized to improve communication performance of the entire system. The network comprises one or more communication systems operating at a millimeter-wave frequency, in which each system is comprised of at least one or more point-to-point or point-to-multipoint radio transceivers. In various embodiments, the different atmospheric absorption rates of different millimeter-wave frequencies are used to reduce electromagnetic interference, to compensate for changing path-loss conditions, and/or to optimize inter-link interferences to enhance communication performance.

28 Claims, 7 Drawing Sheets

SYSTEMS AND METHODS FOR IMPROVING THE QUALITY OF MILLIMETER-WAVE COMMUNICATION

BACKGROUND

Every radio system utilizes one or more electromagnetic waves of various frequencies and wavelengths. Each such wave is subject to various communication conditions dependent, at least to some degree, on the properties of the particular wave. Extremely high frequency waves, typically in the range of 30 GHz-300 GHz, are often called "millimeter-waves" due to their very short wavelength. It is a characteristic of millimeter-waves that they are subject to various environmental conditions, including for example the operation of other nearby millimeter-wave systems, and atmospheric conditions such as the temporary presence of raindrops or the permanent presence of pine needles.

The underlying technical characteristics of millimeter-wave frequencies cannot be changed. However, it may be possible, by using the characteristics of such millimeter-wave systems, to either reduce or even neutralize communication problems, or to actually use the unique characteristics of millimeter-wave frequencies to improve the quality of millimeter-wave communication.

SUMMARY

Described herein are systems and methods in millimeter-wave networks, typically operating within the range of 30 GHz-300 GHz, wherein the network is engineered in such a manner as to reduce the inefficiencies in millimeter-wave frequencies, or even to utilize the particular characteristics of millimeter-waves to increase the quality of communication in the system.

One embodiment is a millimeter-wave communication network configured to react to changing communication conditions by exploiting atmospheric absorption rates. In one particular form of such an embodiment, the network includes a first millimeter-wave communication system, and a second millimeter-wave communication system configured to communicate in a point-to-point manner with the first millimeter-wave communication system at a first millimeter-wave frequency having a particular atmospheric absorption rate. Also in this particular embodiment, the first millimeter-wave communication system is configured to detect a change in at least one communication condition affecting communication between the first and second systems, and then react to such change by switching from the first millimeter-wave frequency to a second millimeter-wave frequency having an atmospheric absorption rate different from the atmospheric absorption rate of the first frequency.

One embodiment is a method for reducing electromagnetic interferences by exploiting atmospheric absorption of millimeter-waves. In one particular form of such embodiment, a first millimeter-wave communication system operating at a first millimeter-wave frequency detects at least one other millimeter-wave source interfering at least with the operation of the first system. The first system then switches its operation from the first millimeter-wave frequency to a different frequency having a higher atmospheric absorption rate than that of the first frequency, the effect of which is to reduce the effective reception range of the first millimeter-wave communication system such that the switch frequencies reduces the electromagnetic interference.

One embodiment is a method for compensating for changing path-loss conditions in a millimeter-wave communication system. In one particular form of such embodiment, first and second millimeter-wave communication systems communicate point-to-point over a predetermined distance at a second millimeter-wave frequency having a second atmospheric absorption rate, resulting in a second path-loss associated with said predetermined distance. Either or both of the systems detect a change form the second path-loss to a first path-loss associated with the predetermined distance. To compensate substantially for such change in path-loss, the systems switch from the second millimeter-wave frequency to a first millimeter-wave frequency having a first atmospheric absorption rate which is different than the atmospheric absorption rate of the second millimeter-wave frequency.

One embodiment is a method for optimizing inter-link interferences by exploiting atmospheric absorption of millimeter-waves. In one particular form of such embodiment, first and second millimeter-wave communication systems communicate point-to-point at a first millimeter-wave frequency having a first atmospheric absorption rate, resulting in a first path loss. Either or both systems then conclude that the communication link between the systems has a surplus gain in respect to said first path loss. In order to use the surplus gain effectively, the systems increase the path loss from the first pass loss to a second pass loss by switching from the first millimeter-wave frequency to a second millimeter-wave frequency having an atmospheric absorption rate that is higher than the atmospheric absorption rate of the first millimeter-wave frequency.

BRIEF DESCRIPTION OF THE DRAWINGS

The embodiments are herein described, by way of example only, with reference to the accompanying drawings. No attempt is made to show structural details of the embodiments in more detail than is necessary for a fundamental understanding of the embodiments. In the drawings.

DETAILED DESCRIPTION

As used herein, "atmospheric absorption rate" is the rate at which a radio wave is absorbed by surrounding atmosphere in which the wave propagates. The atmospheric absorption rate, called here also the "AAR", is typically measured in loss of dB per distance traveled by the radio wave. The AAR is heavily dependent on the frequency of the radio wave. Millimeter-waves, particularly those within the radio band 58 GHz to 62 GHz, have relatively high AARs, and as a result, path loss at these radio frequencies tends to be negatively impacted by the atmospheric environment.

As used herein, "the high AAR band" is the radio frequency band extending from about 58 GHz to 62 GHz, in which the AARs are relatively high, thereby impacting the path loss associated with systems operating within this band.

As used herein, "communication condition" is a condition in the physical environment that affects radio communication either for ill or for good. Examples of potentially negative communication conditions include rain, fog, leaves, pine needles, and physical obstructions. The absence of specific negative communication conditions may be considered "good conditions".

As used herein, "surplus gain", or "surplus system gain", is an excess communication system gain in a communication system or communication network that is not needed for successful communication. The system gain is considered "surplus" because it is beyond what is needed to achieve the desired quality of communication.

As used herein, "communication system" means a system comprising a radio transceiver.

As used herein a "communication network" means two or more radio transceivers that are in communicative contact.

As used herein, "inter-communication network" means two more communication networks that are operating in physical proximity such that systems operating at the same or similar frequencies might interfere with each other.

As used herein, "point-to-point" includes both point-to-point and point-to-multipoint.

Figure 1:
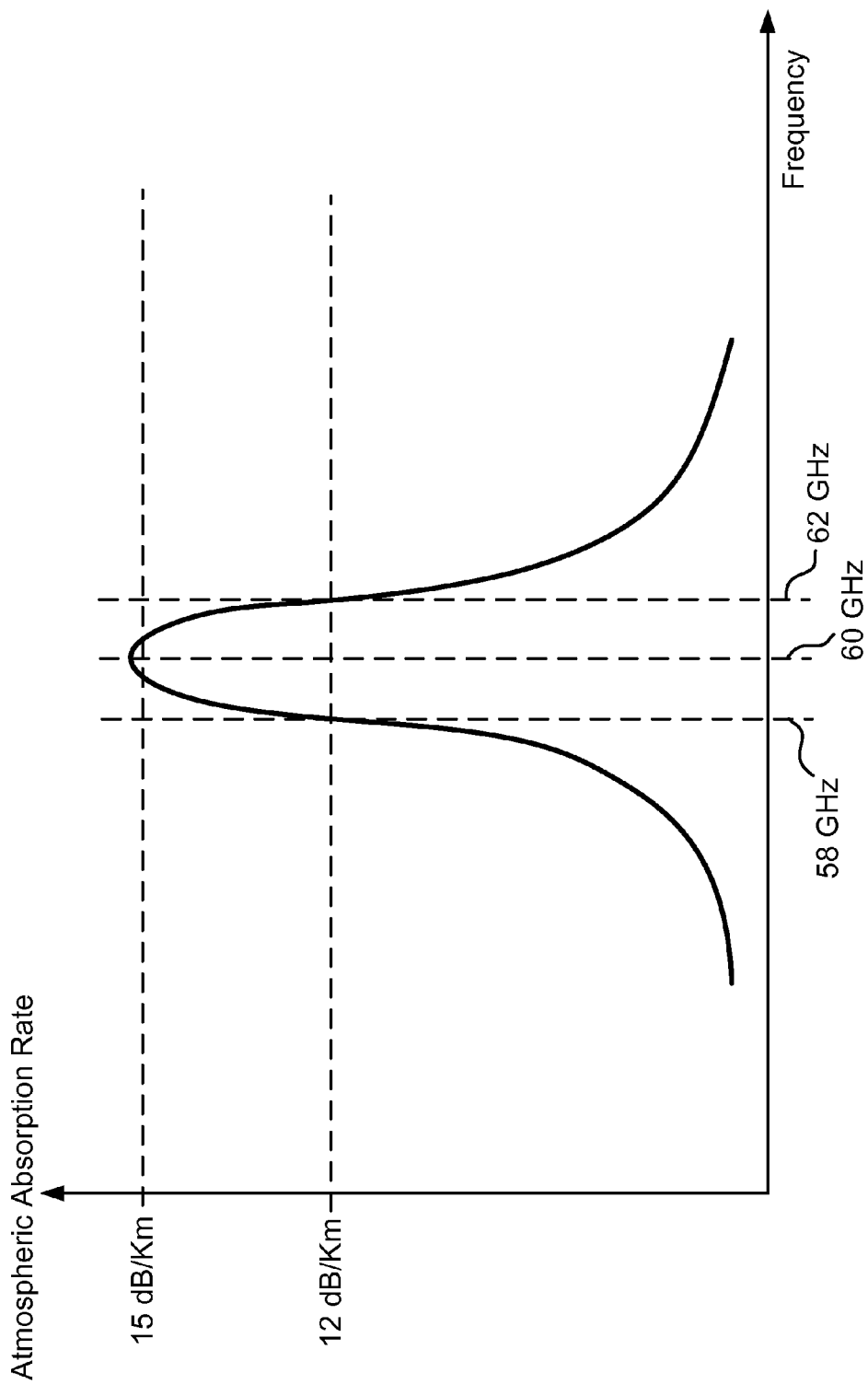
FIG. 1 is a graphic depiction of the atmospheric absorption rates of various millimeter-wave frequencies.

FIG. 1 is a graphic depiction of the atmospheric absorption rates of various millimeter-wave frequencies. As shown, the AAR hits a peak at approximately 60 GHz, where the AAR is slightly more than 15 dB/km. The AAR is still relatively high at all frequencies within the range of about 58 GHz to 62 GHz, wherein the AAR is about 12 dB/km at both 58 GHz and 62 GHz. The AAR falls off at a very rapid rate either lower than 58 GHz or higher than 62 GHz. FIG. 1 illustrates the physics of AAR, which are related to various embodiments described here.

Figure 2A:
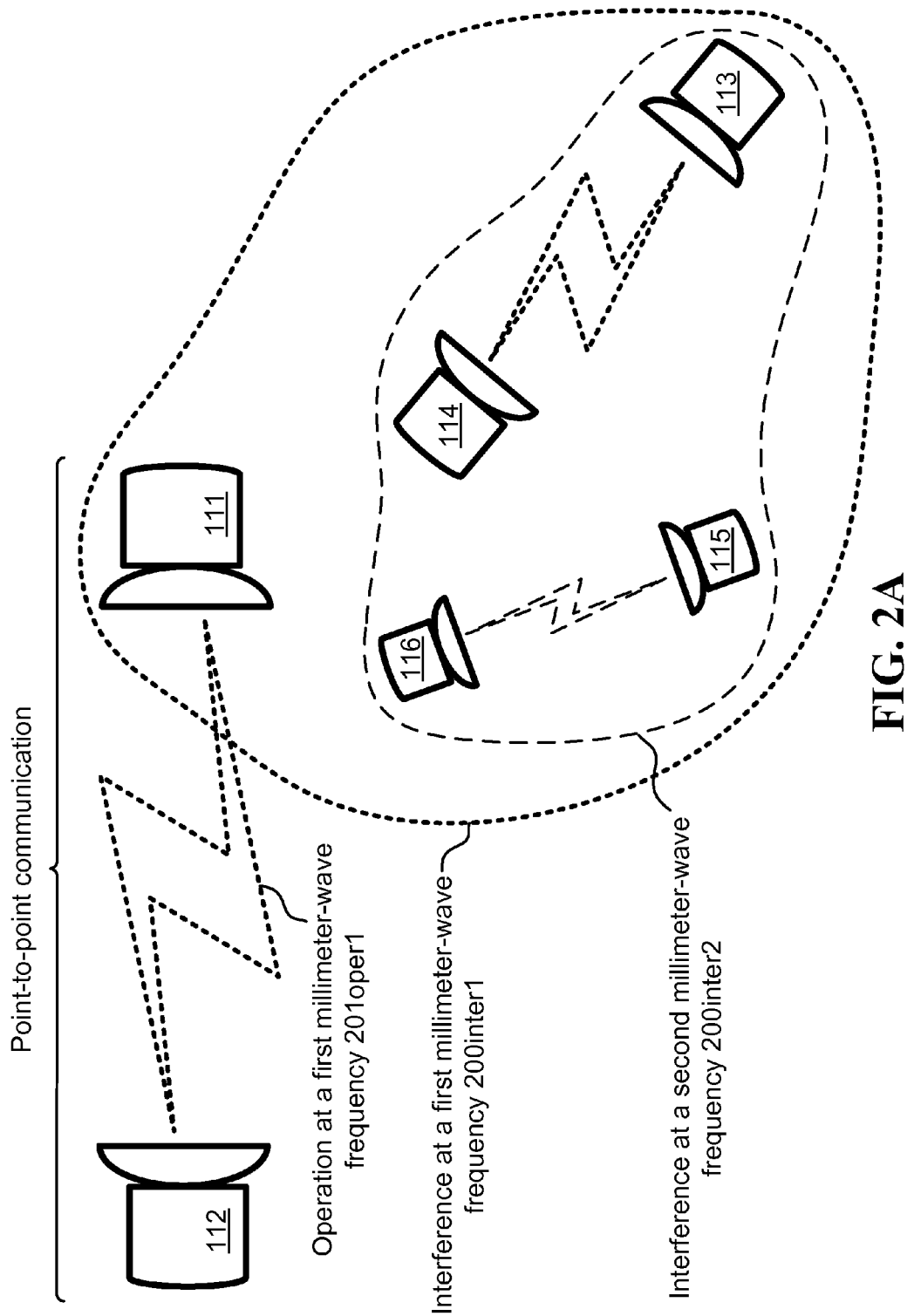
FIG. 2A illustrates one embodiment of multiple point-to-point millimeter-wave communication networks, in which some systems are interfering with the communication of other systems, and some systems are not interfering with the communication of other systems.

FIG. 2A illustrates one embodiment of multiple point-to-point millimeter-wave communication networks, in which some systems are interfering with the communication of other systems, and some systems are not interfering with the communication of other systems. There are three communication networks illustrated. The networks represented by systems 111 and 112, and by systems 113 and 114, are operating at a first millimeter-wave frequency that outside of the high AAR band. As a result, the radio waves propagate distances sufficient to cause interference between these two systems. In contrast, the network represented by systems 115 and 116 is operating at a second millimeter-wave frequency that is within the high AAR band, so that its propagation distance is restricted and does not reach the network with 111 and 112. Solely as non-limiting examples, in this case first millimeter-wave frequency might be 63 GHz and the second millimeter-wave frequency might be 60 GHz. As depicted in FIG. 2A, network 111-112 is operating 201oper1 at a first millimeter-wave frequency which is outside the high AAR band. At the same time, network 113-114 is operating at the same first-millimeter-wave frequency, which produces interference 200inter1 with receptions occurring at system 111. Also, network 115-116 is operating at a second millimeter-wave frequency inside the AAR band, producing interference 200inter2, which does not interfere with receptions at system 111 both because networks 111-112 and 115-116 are operating at different frequencies and because the area covered by 200inter2 does not include system 111.

Figure 2B:
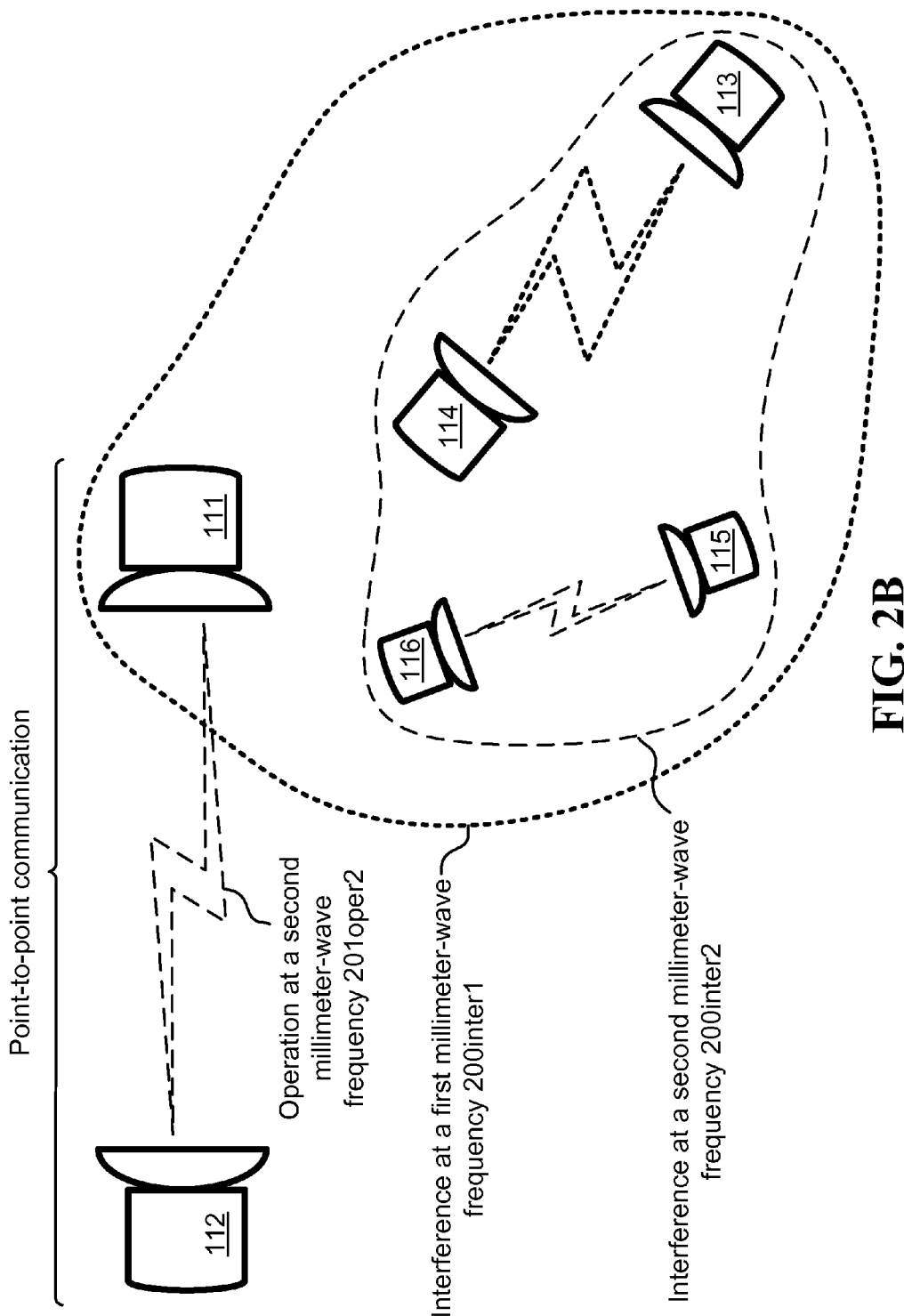
FIG. 2B illustrates one embodiment of multiple point-to-point millimeter-wave communication networks, in which one network has shifted to a second millimeter-wave frequency such that the system that was formerly interfered with by another network is no longer interfered with by that network.

FIG. 2B illustrates one embodiment of multiple point-to-point millimeter-wave communication systems, in which one system has shifted to a second millimeter-wave frequency such that the system that has shifted frequency does not interfere with nor is interfered by the other millimeter-wave communication systems. In FIG. 2B, the system represented by transceivers 111 and 112 has now switched frequencies from the first millimeter-wave frequency, which in the example above was at 63 GHz, to the second millimeter-wave frequency, which in the example above was at 60 GHz. Systems 113-114 and 115-116 do not change their frequencies. The result, as shown in FIG. 2B, is that systems 111-112 and 113-114 no longer interfere with one another, since they are operating at 60 GHz and 63 GHz respectively, and at the same time systems 111-112 and 115-116 are not interfering with one another even though they are both operating at 60 GHz, because their propagation distances are not sufficiently long. The propagation distance of 111-112 has been reduced by a switch from outside the high AAR band to inside the high AAR band. Thus, the properties of high atmospheric absorption have been used to increase communication of the overall network by reducing inter-system interference.

Figure 3A:
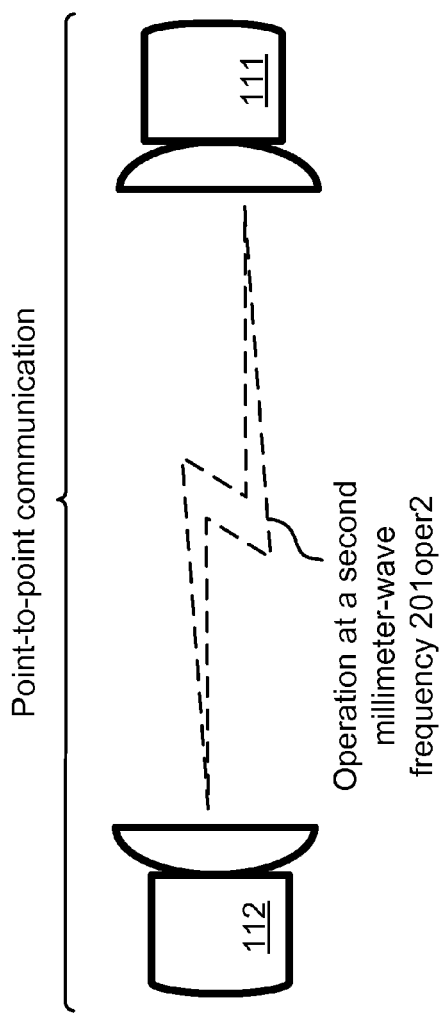
FIG. 3A illustrates one embodiment of a millimeter-wave communication network operating at a second millimeter-wave frequency.

FIG. 3A illustrates one embodiment of a millimeter-wave communication network operating 201oper2 at a second millimeter-wave frequency. In this case, the network represented by systems 111 and 112 is operating at a second millimeter-wave frequency which is within the high AAR band. However, there is a problem as shown in FIG. 3B.

Figure 3B:
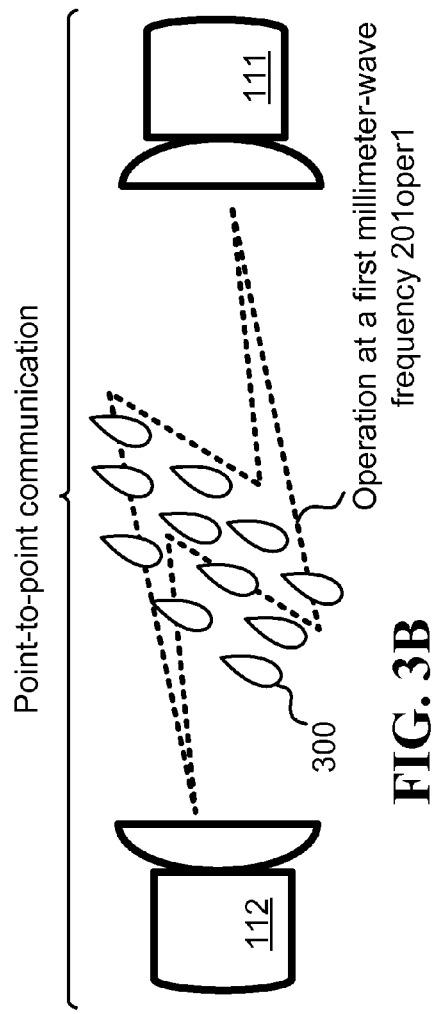
FIG. 3B illustrates one embodiment of a millimeter-wave communication network in which operating conditions have degraded due to the presence of an external interference, so the system has shifted to a first millimeter-waver frequency which is less subject to the interference than the second millimeter-wave frequency.

FIG. 3B illustrates one embodiment of a millimeter-wave communication network in which operating conditions have degraded due to the presence of an external interference, so the network has shifted to operation 201oper1 in a first millimeter-wave frequency which is less subject to the interference than the second millimeter-wave frequency. The network 111-112 was formerly operating within the high AAR band, which increases the network susceptibility to adverse communication conditions such as, but not limited to, raindrops as shown in FIG. 3B. When communication degrades due to these communication conditions, the network 111-112 shifts to a millimeter-wave frequency outside the high AAR band, which may be below 58 GHz or above 62 GHz.

In one embodiment, there is a millimeter-wave communication network configured to react to changing communication conditions by exploiting atmospheric absorption rates. The network includes a first millimeter-wave communication system 111, and a second millimeter-wave communication system 112 configured to communicate point-to-point with said first millimeter-wave communication system 111, at a first millimeter-wave frequency having a first atmospheric absorption rate. In this particular embodiment, the first millimeter-wave communication system 111 is configured to: (i) detect a change in at least one communication condition associated with the communication between the first 111 and second 112 systems, and (ii) in reaction to such change, to switch from the first millimeter-wave frequency to a second millimeter-wave frequency having a second atmospheric absorption rate which is different than said first atmospheric absorption rate.

In one alternative to the millimeter-wave network embodiment just described, the first millimeter-wave communication system 111 comprises at least a first radio transceiver, and the second millimeter-wave communication system 112 comprises at least a second radio transceiver in communicative contact with the first radio transceiver.

In one variation of the alternative embodiment just described, the change in communication condition is a change in path loss.

In one permutation of the variation just described, the change in the path loss is associated with rain.

In a second permutation of the variation just described, the change in the path loss is associated with undesired movement of an antenna belonging to the first millimeter-wave communication system 111.

In a second alternative embodiment to the millimeter-wave network embodiment described above, the change in communication condition is associated with electromagnetic interference.

In a third alternative embodiment to the millimeter-waver network embodiment described above, the change in communication condition is associated with a physical blockage or other interference of the radio path between the first and second radio transceivers.

In a fourth alternative embodiment to the millimeter-wave network embodiment described above, the change in communication condition is associated with an initial surplus system gain between the first and second transceivers.

Figure 4:
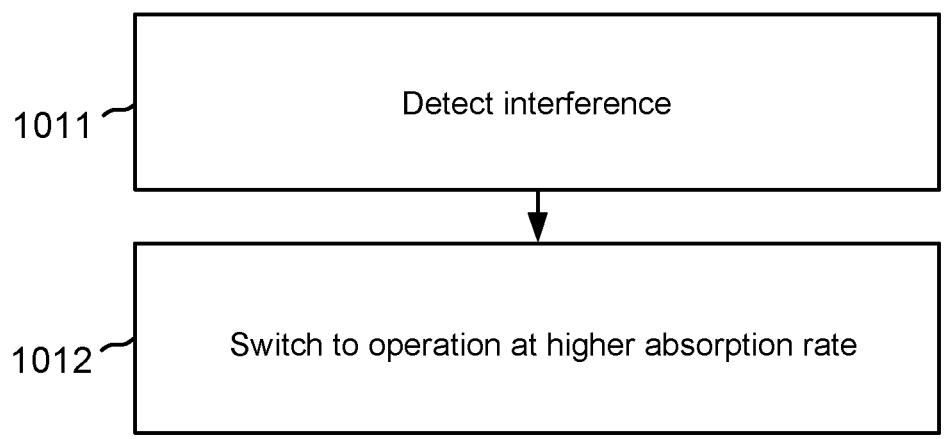
FIG. 4 illustrates a flow diagram describing one embodiment of a method for exploiting atmospheric absorption of millimeter waves.

FIG. 4 illustrates one embodiment of a method for exploiting atmospheric absorption of millimeter-waves. In step 1011, a first communication system 111 operating 201oper1 at a first millimeter-wave frequency, detects at least one millimeter-wave source interfering with such operation. In step 1012, the first communication system 111 then shift to operation 201oper2 at a second millimeter-wave frequency which has an AAR that his higher than the AAR of the first frequency, thereby reducing the effective reception range of the first system 111, thereby reducing the interference.

In one alternative embodiment to the method for exploiting atmospheric absorption of millimeter-waves just described, the interference is caused by at least a third millimeter-wave communication system 113 not associated with said first millimeter-wave communication system 111.

In a second alternative embodiment to method for exploiting atmospheric absorption of millimeter-waves just described, the second millimeter-wave frequency is located within the high AAR band.

In one variation of the second alternative embodiment just described, the second millimeter-wave frequency is absorbed by the atmosphere at a rate greater than 12 dB/Km.

In a second variation of the second alternative embodiment described above, the second millimeter-wave frequency is absorbed by the atmosphere at a rate greater than 15 dB/Km, and the second millimeter-wave frequency is substantially 60 GHz.

In a third variation of the second alternative embodiment described above, the higher AAR is caused by atmospheric oxygen.

In a fourth variation of the second alternative embodiment described above, the first millimeter-wave frequency is located above 62 GHz.

In one permutation of the fourth variation just described, the first millimeter-wave frequency is absorbed by the atmosphere at a rate below 12 dB/km.

In a fifth variation of the second alternative embodiment described above, the first millimeter-wave frequency is located below 58 GHz.

In one permutation of the fifth variation just described, the first millimeter-wave frequency is absorbed at a rate below 12 dB/km.

In a third alternative embodiment to method for exploiting atmospheric absorption of millimeter-waves described above, the first millimeter-wave communication system 111 belongs to a point-to-point millimeter-wave communication network comprising the first millimeter-wave communication system 111 and a second millimeter-wave communication system 112.

Figure 5:
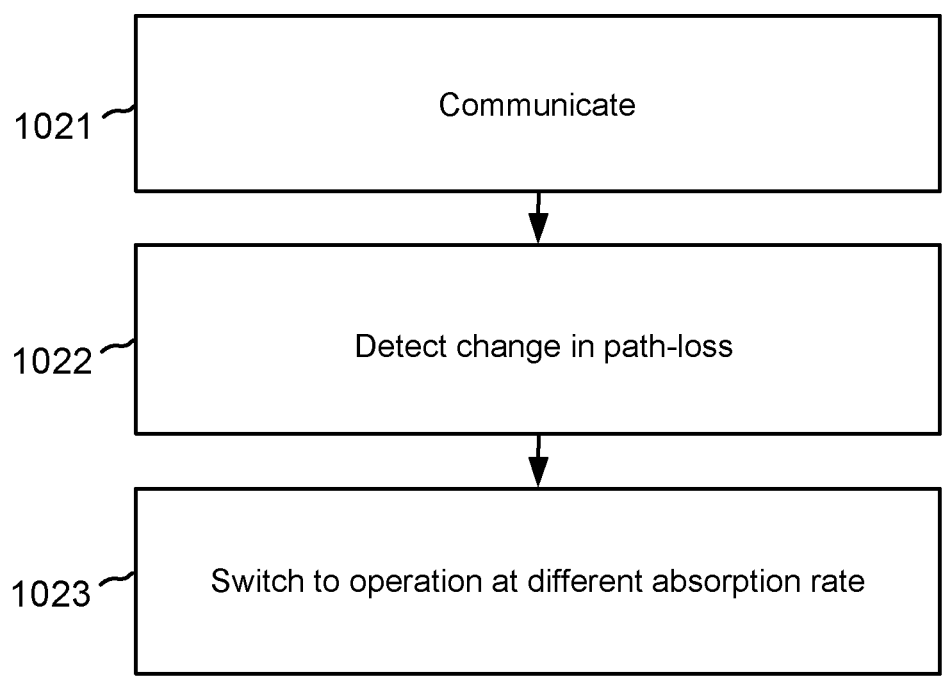
FIG. 5 illustrates a flow diagram describing one embodiment of a method for compensating for changing path-loss conditions in a millimeter-wave communication network.

FIG. 5 illustrates one embodiment of a method for compensating for changing path-loss conditions in a millimeter-wave communication network. In step 1021, first 111 and second 112 millimeter-wave communication systems communicate point-to-point over a predetermined distance at a second millimeter-wave frequency having a second atmospheric absorption rate, resulting in a second path-loss associated with the predetermined distance. In step 1022, either system 111 or system 112 detects a change from the second path loss to a first path loss associated with the predetermined distance. In step 1023, system 111 and system 112 switch from the second millimeter-wave frequency to a first millimeter-wave frequency having a first atmospheric absorption rate which is different than said second atmospheric absorption rate, such that said difference in AARs between the two frequencies substantially compensates for said change in path-loss conditions.

In a first alternative embodiment to the method for compensating for changing path-loss conditions in a millimeter-wave communication network, the change is caused by changing atmospheric conditions.

In a first variation of the first alternative embodiment just described, the changing atmospheric condition is rain.

In a first permutation of the first variation just described the second path-loss is associated with a no-rain condition and the first path-loss is associated with a rain condition. As a result, the first path-loss is higher than the second path-loss, the first AAR is lower than the second AAR, and the difference between the first AAR and the second AAR substantially compensates for the rain.

In a second alternative embodiment to the method for compensating for changing path-loss conditions in a millimeter-wave communication network, the change is caused by a disruption in a line-of-sight condition between the first 111 and second 112 millimeter-wave communication systems.

Figure 6:
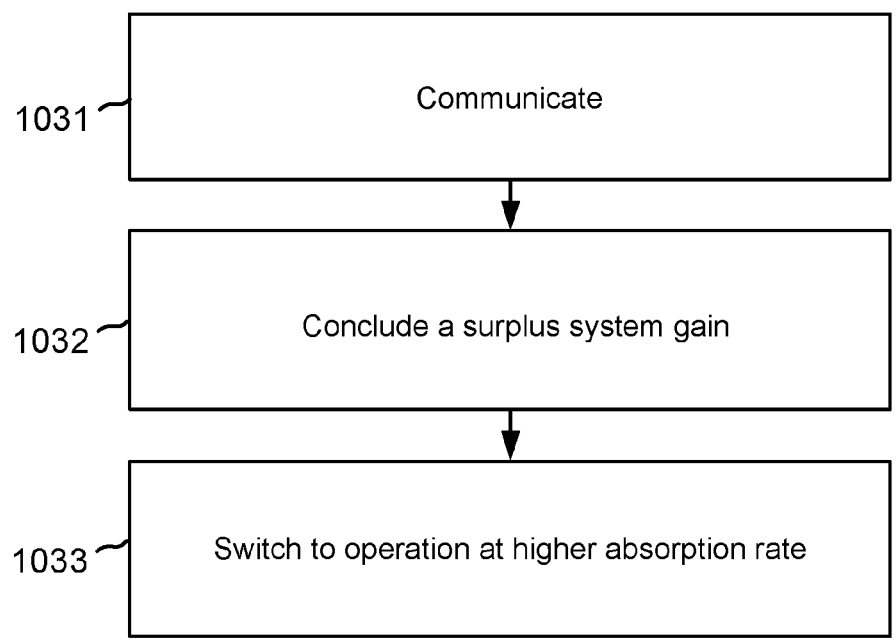
FIG. 6 illustrates a flow diagram describing one method for optimizing inter-link interferences by exploiting atmospheric absorption of millimeter-waves.

FIG. 6 illustrates one embodiment of a method for optimizing inter-link interferences by exploiting atmospheric absorption of millimeter-waves. In step 1031, first 111 and second 112 millimeter-wave communication systems communicate point-to-point via a frequency having a first atmospheric absorption rate, resulting in a first path loss. In step 1032, the first 111 and/or the second 112 millimeter-wave communication systems conclude that the communication between them has a surplus system gain in respect to said first path loss. In step 1033, the first 111 and second 112 millimeter-wave communication systems increase the path-loss from the first path-loss to a second path-loss by switching from the first millimeter-wave frequency to a second millimeter-wave frequency having a second AAR which is higher than said first AAR, thereby adjusting the path-loss from the first path-loss to a second path loss that is higher than said first path loss, thereby making use of said surplus system gain.

In a first alternative embodiment to the embodiment of a method for optimizing inter-link interferences by exploiting atmospheric absorption of millimeter-waves, the adjusting of path-loss reduces interference with other near-by millimeter-wave communication systems.

In a second alternative embodiment to the embodiment of a method for optimizing inter-link interferences by exploiting atmospheric absorption of millimeter-waves, the conclusion of a surplus system gain is made by measuring a signal-to-noise ratio at a receiver belonging to the first 111 or second 112 millimeter-wave communication systems and determining that this signal-to-noise ratio is higher than a minimum signal-to-noise ratio needed to support a predetermined rate of communication.

In a third alternative embodiment to the embodiment of a method for optimizing inter-link interferences by exploiting atmospheric absorption of millimeter-waves, the conclusion of a surplus system gain is made by measuring a packet or bit error rate at a receiver belonging to the first 111 or second 112 millimeter-wave communication systems and determining that said packet or bit error rate is lower than a maximum bit error rate allowed for a predetermined quality of communication.

In a third alternative embodiment to the embodiment of a method for optimizing inter-link interferences by exploiting atmospheric absorption of millimeter-waves, the conclusion of a surplus system gain and increasing the path-loss are repeated until a resulting path-loss is reached which makes use of all surplus system gain, such that any further increments to path-loss will adversely affect said communication.

In this description, numerous specific details are set forth. However, the embodiments/cases of the invention may be practiced without some of these specific details. In other instances, well-known hardware, materials, structures and techniques have not been shown in detail in order not to obscure the understanding of this description. In this description, references to "one embodiment" and "one case" mean that the feature being referred to may be included in at least one embodiment/case of the invention. Moreover, separate references to "one embodiment", "some embodiments", "one case", or "some cases" in this description do not necessarily refer to the same embodiment/case. Illustrated embodiments/cases are not mutually exclusive, unless so stated and except as will be readily apparent to those of ordinary skill in the art. Thus, the invention may include any variety of combinations and/or integrations of the features of the embodiments/cases described herein. Also herein, flow diagrams illustrate non-limiting embodiment/case examples of the methods, and block diagrams illustrate non-limiting embodiment/case examples of the devices. Some operations in the flow diagrams may be described with reference to the embodiments/cases illustrated by the block diagrams. However, the methods of the flow diagrams could be performed by embodiments/cases of the invention other than those discussed with reference to the block diagrams, and embodiments/cases discussed with reference to the block diagrams could perform operations different from those discussed with reference to the flow diagrams. Moreover, although the flow diagrams may depict serial operations, certain embodiments/cases could perform certain operations in parallel and/or in different orders from those depicted. Moreover, the use of repeated reference numerals and/or letters in the text and/or drawings is for the purpose of simplicity and clarity and does not in itself dictate a relationship between the various embodiments/cases and/or configurations discussed. Furthermore, methods and mechanisms of the embodiments/cases will sometimes be described in singular form for clarity. However, some embodiments/cases may include multiple iterations of a method or multiple instantiations of a mechanism unless noted otherwise. For example, when a controller or an interface are disclosed in an embodiment/case, the scope of the embodiment/case is intended to also cover the use of multiple controllers or interfaces.

Certain features of the embodiments/cases, which may have been, for clarity, described in the context of separate embodiments/cases, may also be provided in various combinations in a single embodiment/case. Conversely, various features of the embodiments/cases, which may have been, for brevity, described in the context of a single embodiment/case, may also be provided separately or in any suitable sub-combination. The embodiments/cases are not limited in their applications to the details of the order or sequence of steps of operation of methods, or to details of implementation of devices, set in the description, drawings, or examples. In addition, individual blocks illustrated in the figures may be functional in nature and do not necessarily correspond to discrete hardware elements. While the methods disclosed herein have been described and shown with reference to particular steps performed in a particular order, it is understood that these steps may be combined, subdivided, or reordered to form an equivalent method without departing from the teachings of the embodiments/cases. Accordingly, unless specifically indicated herein, the order and grouping of the steps is not a limitation of the embodiments/cases. Embodiments/cases described in conjunction with specific examples are presented by way of example, and not limitation. Moreover, it is evident that many alternatives, modifications and variations will be apparent to those skilled in the art. Accordingly, it is intended to embrace all such alternatives, modifications and variations that fall within the spirit and scope of the appended claims and their equivalents.

What is claimed is:

1. A method for reducing electromagnetic interferences by exploiting atmospheric absorption of millimeter-waves, comprising:
   detecting, by a first millimeter-wave communication system operating at a first millimeter-wave frequency, at least one other millimeter-wave source interfering at least with said operation; and
   based on said detection, switching, by said first millimeter-wave communication system, to operation at a second millimeter-wave frequency selected to obtain a higher atmospheric absorption rate than said first millimeter-wave frequency, thereby reducing effective reception range of said first millimeter-wave communication system, thereby reducing said interference.

2. The method of claim 1, wherein said interference is caused by at least a third millimeter-wave communication system not associated with said first millimeter-wave communication system.

3. The method of claim 1, wherein said second millimeter-wave frequency is located between 58 GHz and 62 GHz.

4. The method of claim 3, wherein said second millimeter-wave frequency is absorbed by the atmosphere at a rate of above 12 dB/Km.

5. The method of claim 3, wherein said second millimeter-wave frequency is absorbed by the atmosphere at a rate of above 15 dB/Km, and said second millimeter-wave frequency is substantially 60 GHz.

6. The method of claim 3 wherein said higher atmospheric absorption rate is caused by atmospheric oxygen.

7. The method of claim 3, wherein said first millimeter-wave frequency is located above 62 GHz.

8. The method of claim 7, wherein said first millimeter-wave frequency is absorbed by the atmosphere at a rate of below 12 dB/Km.

9. The method of claim 3, wherein said first millimeter-wave frequency is located below 58 GHz.

10. The method of claim 9, wherein said first millimeter-wave frequency is absorbed by the atmosphere at a rate of below 12 dB/Km.

11. The method of claim 1, wherein said first millimeter-wave communication system belongs to a point-to-point millimeter-wave communication network comprising said first millimeter-wave communication system and a second millimeter-wave communication system.

12. A method for compensating for changing path-loss conditions in a millimeter-wave communication network, comprising:
communicating point-to-point, at a second millimeter-wave frequency having a second atmospheric absorption rate, between a first and a second millimeter-wave communication systems over a predetermined distance resulting in a second path-loss associated with said predetermined distance;
detecting a change from said second path-loss to a first path loss associated with said predetermined distance; and
based on said detection, switching from said second millimeter-wave frequency to a first millimeter-wave frequency selected to obtain a first atmospheric absorption rate which is different than said second atmospheric absorption rate, such that said difference substantially compensates for said change in path-loss conditions.

13. The method of claim 12, wherein said change is caused by a changing atmospheric condition.

14. The method of claim 13, wherein said changing atmospheric condition is rain.

15. The method of claim 14, wherein: (i) said second path-loss is associated with a no-rain condition and said first path-loss is associated with a rain condition, (ii) thereby said first path loss is higher than said second path loss, (iii) said first atmospheric absorption rate is lower than said second atmospheric absorption rate, and (iv) thereby the difference between said first and second atmospheric absorption rates substantially compensates for said rain.

16. The method of claim 12, wherein said change is caused by a disruption in a line-of-sight condition between said first and second millimeter-wave communication systems.

17. A method for optimizing inter-link interferences by exploiting atmospheric absorption of millimeter-waves:
communicating point-to-point, at a first millimeter-wave frequency having a first atmospheric absorption rate, between a first and a second millimeter-wave communication systems resulting in a first path loss;
concluding that said communication has a surplus system gain in respect to said first path loss; and
based on said conclusion, increasing said first path loss to a second path loss by switching from said first millimeter-wave frequency to a second millimeter-wave frequency selected to obtain a second atmospheric absorption rate which is higher than said first atmospheric absorption rate, thereby adjusting said first path loss to a second path loss that is higher than said first path loss, thereby making use of said surplus system gain.

18. The method of claim 17, wherein said adjustment reduces interference with other near-by millimeter-wave communication systems.

19. The method of claim 17, wherein said conclusion is made by measuring a signal-to-noise ratio at a receiver belonging to said first or second millimeter-wave communication systems and determining that said signal-to-noise ratio is higher than a minimum signal-to-noise ratio needed to support a predetermined rate of communication.

20. The method of claim 17, wherein said conclusion is made by measuring a packet or bit error rate at a receiver belonging to said first or second millimeter-wave communication systems and determining that said packet or bit error rate is lower than a maximum bit error rate allowed for a predetermined quality of communication.

21. The method of claim 17, wherein said communicating, concluding, and increasing, are repeated until a resulting path loss is reached which makes use of all said surplus system gain, such that any further increments to path loss will adversely affect said communication.

22. A system comprising a millimeter-wave communication network configured to react to changing communication conditions by exploiting atmospheric absorption rates, comprising:
a first millimeter-wave communication system; and
a second millimeter-wave communication system configured to communicate point-to-point with said first millimeter-wave communication system, at a first millimeter-wave frequency having a first atmospheric absorption rate;
wherein at least said first millimeter-wave communication system is configured to: (i) detect a change in at least one communication condition associated with said communication, and (ii) based on said detection, switch from said first millimeter-wave frequency to a second millimeter-wave frequency selected to obtain a second atmospheric absorption rate which is different than said first atmospheric absorption rate in a specifically intended way, in which said difference is designed to specifically counteract the detected change.

23. The system of claim 22, wherein the first millimeter-wave communication system comprises at least a first radio transceiver, and the second millimeter-wave communication system comprises at least a second radio transceiver in communicative contact with said first radio transceiver.

24. The system of claim 23, wherein said change in communication condition is a change in path loss.

25. The system of claim 24, wherein said change in path loss is associated with rain.

26. The system of claim 23, wherein said change in communication condition is associated with an electromagnetic interference.

27. The system of claim 23, wherein said change in communication condition is associated with a physical blockage or other interference of the radio path between said first and second radio transceivers.

28. The system of claim 23, wherein said change in communication condition is associated with an initial surplus system gain between said first and second radio transceivers.

* * * * *